(12) United States Patent
Huang et al.

(10) Patent No.: US 11,949,525 B2
(45) Date of Patent: Apr. 2, 2024

(54) GROUP OPERATION PROCESSING METHOD, APPARATUS, AND SYSTEM, DEVICE, AND STORAGE MEDIUM

(71) Applicant: Tencent Technology (Shenzhen) Company Limited, Shenzhen (CN)

(72) Inventors: Tieming Huang, Shenzhen (CN); Xiaoqiang Zhao, Shenzhen (CN); Hang Xiang, Shenzhen (CN); Bin Li, Shenzhen (CN); Linsheng Deng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 66 days.

(21) Appl. No.: 17/746,772

(22) Filed: May 17, 2022

(65) Prior Publication Data
US 2022/0278863 A1  Sep. 1, 2022

Related U.S. Application Data

(63) Continuation of application No. PCT/CN2021/093212, filed on May 12, 2021.

(30) Foreign Application Priority Data

Jun. 12, 2020 (CN) .......................... 202010535966.0

(51) Int. Cl.
*G06F 15/16* (2006.01)
*H04L 12/18* (2006.01)
(Continued)

(52) U.S. Cl.
CPC .......... *H04L 12/1813* (2013.01); *H04L 51/04* (2013.01); *H04L 51/52* (2022.05)

(58) Field of Classification Search
CPC ..... H04L 12/1813; H04L 51/04; H04L 51/52; H04L 9/32
See application file for complete search history.

(56) References Cited

U.S. PATENT DOCUMENTS

2006/0064741 A1* 3/2006 Terao .................... H04L 63/083
726/4
2017/0075868 A1* 3/2017 Luo ........................ G06F 40/134
(Continued)

FOREIGN PATENT DOCUMENTS

CN     102930226 A    2/2013
CN     103346921 A    10/2013
(Continued)

OTHER PUBLICATIONS

Tencent Technology, ISR, PCT/CN2021/093212, dated Aug. 10, 2021, 2 pgs.
(Continued)

*Primary Examiner* — Yves Dalencourt
(74) *Attorney, Agent, or Firm* — Morgan, Lewis & Bockius LLP

(57) ABSTRACT

A server system receives a group operation request transmitted by a client. The group operation request is generated by the client in response to a trigger operation of a target group chat function, and includes a target identity and a target group chat function identifier. The server system determines a target group chat function use permission corresponding to the target identity. In accordance with a determination, based on the target group chat function use permission and the target group chat function identifier, that a user corresponding to the target identity has a permission to use the target group chat function, the server system transmits group operation result information to the client.

19 Claims, 10 Drawing Sheets

Receive a group operation request transmitted by a client, the group operation request being generated by the client in response to a trigger operation of a target group function, the target group function including functions related to a target group including a plurality of users, the group operation request including a target identity and a target group function identifier — 201

Determine a target group function use permission corresponding to the target identity — 202

Transmit group operation result information to the client in accordance with a determination, according to the target group function use permission and the target group function identifier, that a user corresponding to the target identity has a permission to use the target group function — 203

(51) Int. Cl.
*H04L 51/04* (2022.01)
*H04L 51/52* (2022.01)

(56) References Cited

U.S. PATENT DOCUMENTS

2017/0372582 A1* 12/2017 Qiao .................... A61B 5/7275
2020/0252405 A1* 8/2020 Sankavaram ........... G06F 21/62

FOREIGN PATENT DOCUMENTS

| | | |
|---|---|---|
| CN | 106411720 A | 2/2017 |
| CN | 107809371 A | 3/2018 |
| CN | 108243194 A | 7/2018 |
| CN | 108847948 A | 11/2018 |
| CN | 109617793 A | 4/2019 |
| CN | 110719173 A | 1/2020 |
| CN | 110826050 A | 2/2020 |
| CN | 110839104 A | 2/2020 |
| CN | 111711529 A | 9/2020 |
| TW | 201733311 A | 9/2017 |
| WO | WO 2018045977 A1 | 3/2018 |

OTHER PUBLICATIONS

Tencent Technology, WO, PCT/CN2021/093212, dated Aug. 10, 2021, 5 pgs.
Tencent Technology, IPRP, PCT/CN2021/093212, dated Dec. 13, 2022, 6 pgs.

\* cited by examiner

| Enterprise information | User roles | User role information |
|---|---|---|
| Role configuration | Super administrator | Super administrator |
| Permission configuration | Common administrator<br>Group administrator | Manage all employees in the enterprise |
| Security and privacy | Common user | Group function use permission configuration |
| Settings | Whitelist user | ☐ Create a group<br>☐ Add a group member<br>☐ Remove a group member<br>☐ Leave a group<br>☐ Modify a group name<br>☐ Modify a group notice |
| | | Done |

FIG. 7

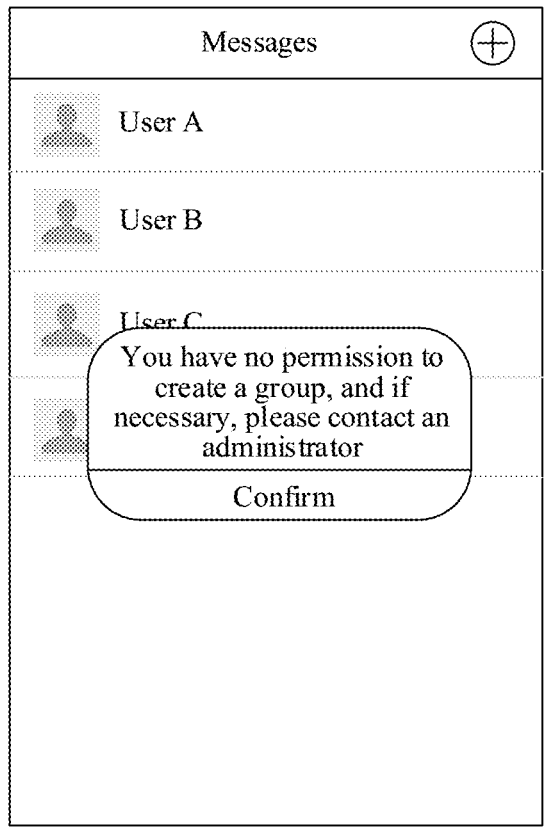
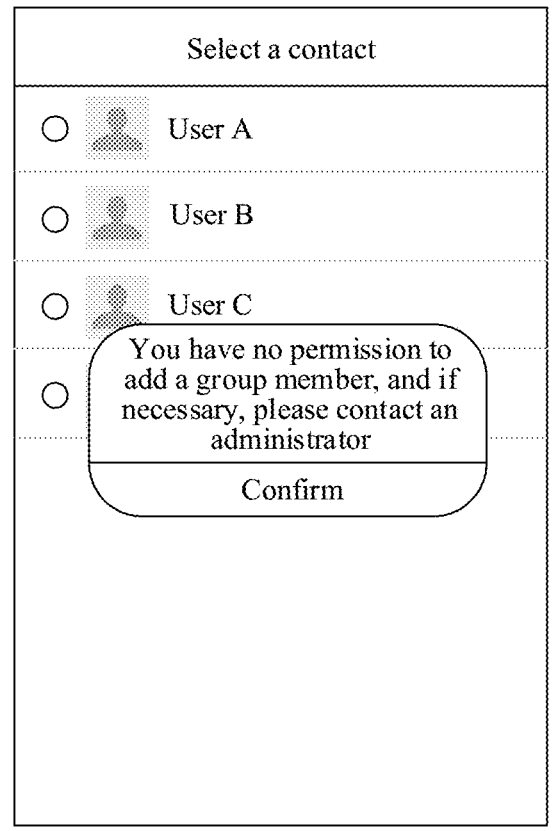
Interface a     Interface b
FIG. 8

GROUP OPERATION PROCESSING METHOD, APPARATUS, AND SYSTEM, DEVICE, AND STORAGE MEDIUM

CROSS-REFERENCE TO RELATED APPLICATIONS

This application is a continuation application of PCT Patent Application No. PCT/CN2021/093212, entitled "GROUP OPERATION PROCESSING METHOD, APPARATUS AND SYSTEM, DEVICE, AND STORAGE MEDIUM" filed on May 12, 2021, which claims priority to Chinese Patent Application No. 202010535966.0, filed with the State Intellectual Property Office of the People's Republic of China on Jun. 12, 2020, and entitled "GROUP OPERATION PROCESSING METHOD, APPARATUS, AND SYSTEM, DEVICE, AND STORAGE MEDIUM", all of which are incorporated herein by reference in their entirety.

FIELD OF THE TECHNOLOGY

This application relates to the field of Internet technologies, and in particular, to group operation processing.

BACKGROUND OF THE DISCLOSURE

With the rapid development of Internet technologies, instant messaging applications (APP) have become indispensable communication tools in daily work and life of people. Currently, many instant messaging APPs may provide a user with rich group functions, such as creating a group chat, adding a group member, removing a group member, and leaving a group chat. The user may freely use various group functions according to personal requirements.

SUMMARY

Embodiments of this application provide a group operation processing method, apparatus, and system, a device, and a storage medium, to adapt to specific scenario requirements and flexibly control the use of a group function by a user.

In view of this, according to a first aspect, an embodiment of this application provides a group operation processing method, including:
  receiving a group operation request transmitted by a client, the group operation request being generated by the client in response to a trigger operation of a target group chat function, the target group chat function including functions related to a target group chat including a plurality of users; and the group operation request including a target identity and a target group chat function identifier corresponding to the target group chat function;
  determining a target group chat function use permission corresponding to the target identity; and
  transmitting group operation result information to the client in accordance with a determination, based on the target group chat function use permission and the target group chat function identifier, that a user corresponding to the target identity has a permission to use the target group chat function.

According to a second aspect, an embodiment of this application provides a group operation processing apparatus, including:
  a receiving module, configured to receive a group operation request transmitted by a client, the group operation request being generated by the client in response to a trigger operation of a target group chat function, the target group chat function including functions related to a target group chat including a plurality of users; and the group operation request including a target identity and a target group chat function identifier corresponding to the target group chat function;
  a permission determining module, configured to determine a target group chat function use permission corresponding to the target identity; and
  a transmission module, configured to transmit group operation result information to the client in accordance with a determination, according to the target group chat function use permission and the target group chat function identifier, that a user corresponding to the target identity has a permission to use the target group chat function.

According to a third aspect, an embodiment of this application provides a group operation processing system including: a terminal device and a server, a client running on the terminal device,
  the client being configured to: generate a group operation request in response to a trigger operation of a target group chat function, the target group chat function including functions related to a target group chat including a plurality of users; and transmit the group operation request to the server; and
  the server being configured to perform the group operation processing method according to the foregoing aspect.

According to a fourth aspect, an embodiment of this application provides a computer device, including:
  a processor, a communication interface, a memory, and a communication bus,
  the processor, the communication interface, and the memory communicating with each other by using the communication bus; the communication interface being an interface of a communication module;
  the memory being configured to store program code, and transmit the program code to the processor; and the processor being configured to invoke instructions of program code in the memory to perform the group operation processing method according to the foregoing aspect.

According to a fifth aspect, an embodiment of this application provides a non-transitory computer-readable storage medium, storing a computer program, the computer program being configured to perform the group operation processing method according to the foregoing aspect.

According to a sixth aspect of this application, a computer program product including instructions is provided, the instructions, when run on a computer, causing the computer to perform the group operation processing method according to the foregoing aspect.

As can be seen from the foregoing technical solutions, the embodiments of this application have the following advantages.

An embodiment of this application provides a group operation processing method. By using method, a corresponding group function use permission is determined for a user, so that the user may be limited to use the group function, which meets specific scenario requirements. Specifically, in the group operation processing method provided in the embodiments of this application, the server may receive a group operation request generated by a client in response to a trigger operation of a target group chat function, the group operation request including a target identity and a target group chat function identifier; the server may then determine a target group chat function use permission corresponding to the target identity; and the server may further determine, according to the target group chat function use permission and the target group chat function identifier, whether a user corresponding to the target identity has a permission to use the target group chat function; and transmit group operation result information to the client in accordance with a determination that the user corresponding to the target identity has the permission to use the target group chat function. Based on the foregoing method provided in the embodiments of this application, a group function use permission corresponding to a user may be determined depending on specific scenario requirements, so that the user can only use a group function to which the user has the use permission. In this way, the use of the group function by the user is flexibly controlled and it is ensured that the specific scenario requirements are met.

BRIEF DESCRIPTION OF THE DRAWINGS

FIG. 7 is a schematic interface diagram of configuring a user role use permission according to an embodiment of this application.

FIG. 8 is a schematic interface diagram of displaying group operation result information according to an embodiment of this application.

DESCRIPTION OF EMBODIMENTS

Figure 1:
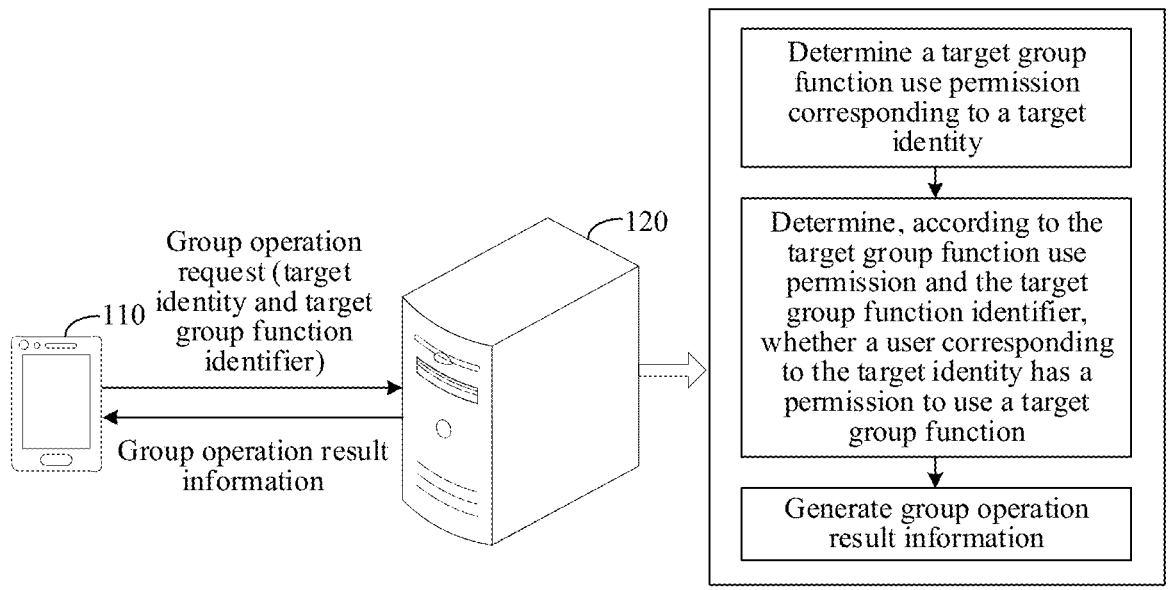
FIG. 1 is a schematic diagram of a working principle of a group operation processing system according to an embodiment of this application.

To make a person skilled in the art understand solutions of this application better, the following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

The terms such as "first", "second", "third", "fourth" and the like (if any) in this specification, claims and the accompanying drawings of this application are intended to distinguish between similar objects, but are not necessarily used for describing any particular order or sequence. It is to be understood that the data termed in such a way are interchangeable in proper circumstances, so that the embodiments of this application described herein can be implemented in another order other than the order illustrated or described herein. Moreover, the terms "include", "contain", and any other variants thereof are intended to cover the non-exclusive inclusion, for example, a process, method, system, product, or device that includes a series of steps or units is not necessarily limited to such expressly listed steps or units, but may include other steps or units not expressly listed or inherent to such a process, method, product, or device.

In the related technology, currently, a user may freely use, according to personal requirements of the user, various group functions provided by an instant messaging application (APP). However, a person skilled in the art found that such a group function use manner cannot meet actual use requirements in some application scenarios. For example, for an instant messaging APP directed to enterprise internal employees (e.g., company employees), an enterprise manager usually does not intend that all the enterprise internal employees may freely use group functions such as creating a group chat and adding a group member.

For the foregoing problem in the related technology, an embodiment of this application provides a group operation processing method. By using the method, the use of the group function by the user is flexibly controlled depending on specific scenario requirements.

By using the foregoing group operation processing method, a group function use permission corresponding to a user is determined depending on specific scenario requirements, so that the user can only use a group function to which the user has the use permission. In this way, the use of the group function by the user is flexibly controlled depending on specific scenario requirements, thereby further enriching use scenarios of the group function, effectively reducing a potential security risk of the group function in a sensitive environment, and improving practical value of the group function.

It is to be understood that the group operation processing method provided in the embodiments of this application is applicable to a server. The server may specifically be an application server or a Web server. During actual deployment, the server may be an independent server, or may be a cluster server or a cloud server.

For ease of understanding the group operation processing method provided in the embodiments of this application, a group operation processing system provided in the embodiments of this application is exemplarily described below with reference to an application scenario to which the group operation processing method is applicable.

Referring to FIG. 1, FIG. 1 is a schematic diagram of a working principle of a group operation processing system according to an embodiment of this application. As shown in FIG. 1, the group operation processing system includes a terminal device 110 and a server 120. The terminal device 110 and the server 120 may communicate with each other through a network. A client of the instant messaging APP runs on the terminal device 110. The client may support a user to use a group function related to a group including a plurality of users. The server 120 is configured to perform the group operation processing method provided in the embodiments of this application.

In an actual application, by using the client running on the terminal device 110, the user may trigger and use a target group chat function provided by the client. After detecting that the target group chat function is used by the user, the client may generate a group operation request in response to a user operation of using the target group chat function, the group operation request including a target identity of a current login user on the client and a target group chat function identifier corresponding to the target group chat function. Further, the terminal device 110 may transmit the group operation request to the server 120 through the network.

After receiving the group operation request transmitted by the terminal device 110, the server 120 may determine a target group chat function use permission corresponding to the target identity. For example, the server 120 may directly determine a target group chat function use permission corresponding to the target identity according to a credit rating corresponding to the target identity and/or a sensitive rating corresponding to the target group chat function identifier. In another example, the server 120 may invoke a target correspondence stored in the server, the target correspondence being preset according to a specific scenario requirement and being capable of representing a correspondence between an identity and a group function use permission, and then determine the target group chat function use permission corresponding to the target identity according to the target correspondence.

The server 120 may further determine, according to the target group chat function use permission and the target group chat function identifier carried in the group operation request, whether a user (that is, the current login user on the client) corresponding to the target identity has a permission to use the target group chat function. If yes, group operation result information corresponding to the group operation request transmitted by the terminal device 110 is generated, and the group operation result information is transmitted to the terminal device 110, to display, by using the client in the terminal device 110, an operation result after the user uses the target group chat function. If not, group operation failure information corresponding to the group operation request transmitted by the terminal device 110, to prompt, by using the client in the terminal device 110, the user that the group function fails to be operated.

It is to be understood that the application scenario shown in FIG. 1 is merely used as an example. In an actual application, in addition to a smartphone shown in FIG. 1, the terminal device 110 may alternatively be a desktop computer, a tablet computer, a personal digital assistant (PDA), or the like, and an application scenario to which the group operation processing method provided in the embodiments of this application is applicable is not limited herein.

The group operation processing method provided in this application is described in detail below by using embodiments.

Figure 2:
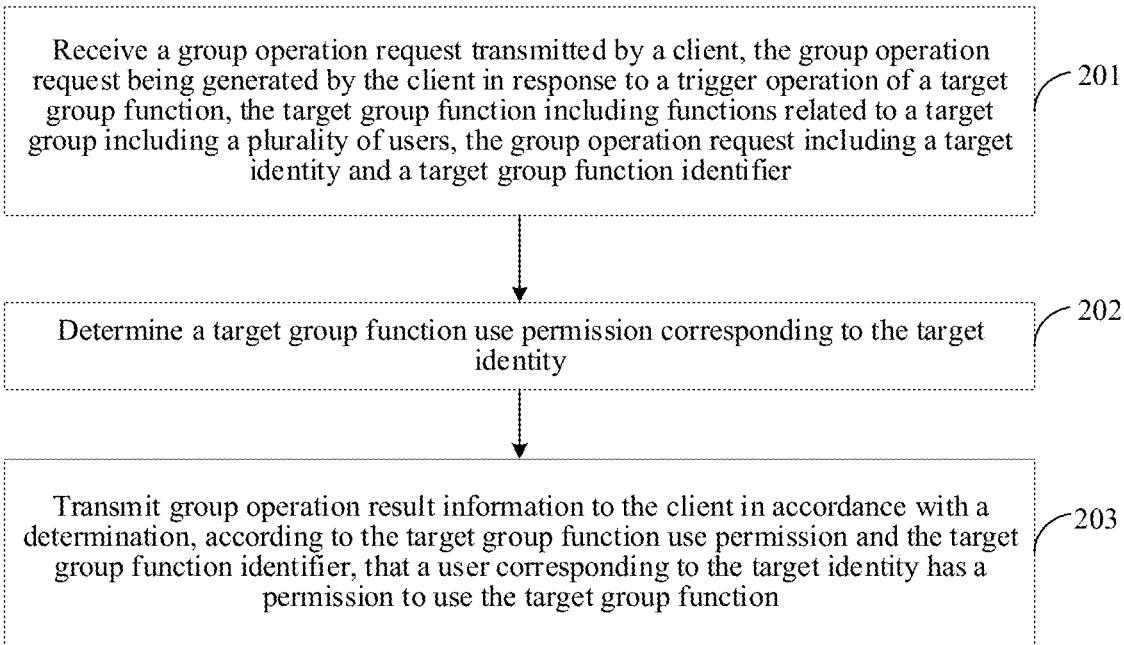
FIG. 2 is a schematic flowchart of a group operation processing method according to an embodiment of this application.

Referring to FIG. 2, FIG. 2 is a schematic flowchart of a group operation processing method according to an embodiment of this application. The method may be performed by the foregoing server. As shown in FIG. 2, the group operation processing method includes the following steps:

Step 201: Receive a group operation request transmitted by a client, the group operation request being generated by the client in response to a trigger operation of a target group chat function, the target group chat function including functions related to a target group chat including a plurality of users; and the group operation request including a target identity and a target group chat function identifier corresponding to the target group chat function.

In an actual application, the client of the instant messaging APP running on the terminal device may usually provide the user with a plurality of group functions related to a user group, such as creating a group, adding a group member, removing a group member, leaving a group, modifying a group name, modifying a group notice, starting a group voice call, and starting a group video call. When using the client, the user may select, according to requirements of the user, to use any group function provided by the client, and the group function selected to be used by the user is regarded as a target group chat function in this application. The client correspondingly generates a group operation request in response to a user operation of using the target group chat function. The group operation request at least includes a target identity of a current login user on the client and a target group chat function identifier corresponding to the target group chat function. Further, the terminal device supporting running of the client may transmit, through the network, the group operation request to the server configured to process a group operation of the instant messaging APP.

The foregoing target identity can uniquely identify the current login user on the client. However, in an actual application, different registered users on the instant messaging APP correspond to different identities, and the identity may be an identity allocated by the server during user registration, or may be an identity customized by the user during user registration. A manner of setting the identity is not limited in this application.

The target group chat function identifier can uniquely identify the target group chat function, and various group functions supported by the client correspond to different group function identifiers. In an actual application, during development of the client of the instant messaging APP, the group functions supported by the client may be divided according to functional characteristics, and different group function identifiers are configured for different group functions obtained through division.

In addition to the foregoing target identity and target group chat function identifier, the group operation request generated by the client in response to the trigger operation of the target group chat function may further include target operation information generated by the client in response to the trigger operation of the target group chat function. The target operation information can represent content of a specific operation performed by the user using the target group chat function.

For example, the target group chat function is creating a group. Assuming that a user m selects to use the function of creating a group and selects a user a, a user b, and a user c from contacts as group members of a to-be-created group chat, the client may generate target operation information in response to the foregoing operation performed by the user m. The target operation information may include identities respectively corresponding to the user a, the user b, and the user c. In another example, the target group chat function is adding a group member. Assuming that the user m triggers an operation of adding a user d as a group member in a group chat A, the client may generate target operation information in response to the operation performed by the user m. The target operation information may include a group identifier corresponding to the group chat A and an identity corresponding to the user d.

It is to be understood that, for different group functions, operation information generated by the client in response to user operations of using the group functions may correspondingly include different content. The content included in the target operation information is not limited in this application.

The target group chat function in this application may be any one of various functions that are supported by the client and are related to a group including a plurality of users. For example, the target group chat function may be any one of the following group functions: creating a group, adding a group member, removing a group member, leaving a group, modifying a group name, modifying a group notice, starting a group voice call, and starting a group video call. The target group chat function is not limited in this application.

Figure 3:
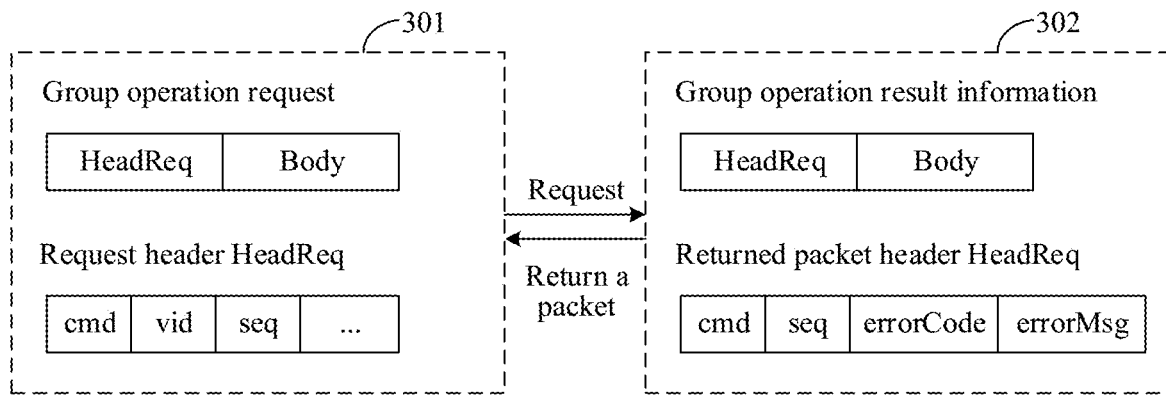
FIG. 3 is a schematic diagram of a data format of group operation information according to an embodiment of this application.

In an actual application, the client and the server may exchange information according to an agreed data format. To be specific, according to the agreed data format, the client may generate a group operation request and transmit the group operation request to the server. An embodiment of this application provides a data format corresponding to an exemplary group operation request. The client may generate the group operation request based on the data format. As shown in 301 in FIG. 3, the group operation request may include a request header HeadReq and a request body. The client may add a target identity and a target group chat function identifier to the request header HeadReq and add target operation information to the request body. As shown in a data format of the request header HeadReq in 301, a cmd field may be used for carrying the target group chat function identifier, a vid field may be used for carrying the target identity, and a sep field may be used for carrying a sequence number corresponding to the group operation request, where the sequence number can uniquely represent one group operation request. In addition, the request header HeadReq may further include other information, for example, a size of data carried in the request body.

It is to be understood that, the data format corresponding to the group operation request may further be represented in another form, and is not limited in this application.

Step 202: Determine a target group chat function use permission corresponding to the target identity.

After receiving the group operation request transmitted by the client, the server may determine, according to information carried in the group operation request, a group function use permission of a user corresponding to the target identity, the group function use permission being referred to as a target group chat function use permission in this application.

In some embodiments, the server may determine a group function use permission of the current login user on the client according to a credit rating of the current login user on the client (e.g., reliability rating of an employee of an enterprise) and/or a sensitive rating (e.g., confidentiality rating) of the target group chat function. Specifically, the server may determine target permission information, the target permission information including at least one of a credit rating corresponding to the target identity or a sensitive rating corresponding to the target group chat function identifier, and further determine a target group chat function use permission according to the target permission information.

In a possible implementation, the server may determine a target group chat function use permission corresponding to the target identity only according to the credit rating corresponding to the target identity. For example, after receiving the group operation request transmitted by the client, the server may extract the target identity from the group operation request, and determine the credit rating corresponding to the target identity based on user credit information corresponding to the target identity. A higher credit rating indicates better credit of the user corresponding to the target identity. The user credit information herein may be determined by the server according to a specific user operation behavior (such as a payment behavior or a group activity processing behavior) performed by the user based on the instant messaging APP, or may be obtained by the server from another associated platform (such as a network bank platform or an enterprise employee information platform). Further, if the server may determine whether the credit rating corresponding to the target identity is higher than a credit rating threshold corresponding to the target group chat function, the server may determine that the user corresponding to the target identity has a permission to use the target group chat function. Correspondingly, the determined target group chat function use permission (which represents a group function that can be used by the user) is required to include the group function identifier corresponding to the target group chat function. It is to be understood that a higher credit rating threshold corresponding to a group function indicates a greater risk of the group function, and it is more necessary to limit the user from using the group function.

In another possible implementation, the server may determine the target group chat function use permission corresponding to the target identity in comprehensive consideration of the credit rating corresponding to the target identity and the sensitive rating corresponding to the target group chat function. For example, the server may pre-determine sensitive ratings respectively corresponding to various group functions based on functional characteristics respectively corresponding to the various group functions. A higher sensitive rating corresponding to the group function indicates a greater risk of the group function, and it is more necessary to limit the user from using the group function. After receiving a group operation request transmitted by the client, the server may extract a target identity and a target group chat function identifier from the group operation request, determine a credit rating corresponding to the target identity based on a user credit information corresponding to the target identity, and determine a sensitive rating corresponding to the target group chat function identifier. Further, whether a user corresponding to the target identity has a permission to use the target group chat function is determined according to the credit rating and the sensitive rating. For example, it is determined that the user corresponding to the target identity has the permission to use the target group chat function in accordance with a determination that the credit rating is higher than a credit rating threshold and the sensitive rating is lower than a sensitive rating threshold.

Correspondingly, the determined target group chat function use permission (which represents a group function that can be used by the user) is required to include the group function identifier corresponding to the target group chat function.

Certainly, in an actual application, the server may alternatively determine in another manner whether the user corresponding to the target identity has a permission to use the target group chat function based on the credit rating corresponding to the target identity and/or the sensitive rating corresponding to the target group chat function identifier. This is not limited in this application.

In some embodiments, the server may obtain a target correspondence. The target correspondence can represent a correspondence between an identity and a group function use permission. Further, the server may determine, according to the target correspondence, the target group chat function use permission corresponding to the target identity carried in the group operation request.

The foregoing target correspondence is preset according to actual scenario requirements and may directly or indirectly represent group function use permissions corresponding to different users. For example, the target correspondence may be a correspondence between the identity of the user and the group function use permission corresponding to the user. The server may directly determine the target group chat function use permission corresponding to the target identity based on the target correspondence. In another example, the target correspondence may include a first correspondence and a second correspondence. The first correspondence is a correspondence between the identity of the user and a user role, and the second correspondence is a correspondence between the user role and the group function use permission. When determining the target group chat function use permission, the server needs to first determine a target user role corresponding to the target identity based on the first correspondence, and then determine the target group chat function use permission based on the target user role and the second correspondence.

It is to be understood that, in an actual application, the group function use permission may include group function identifiers corresponding to group functions allowed to be used by the user. For example, it is assumed that the user m may use only a group function 1 and a group function 2, the group function use permission corresponding to the user m may include group function identifiers respectively corresponding to the group function 1 and the group function 2. The group function use permission may alternatively include group function identifiers corresponding to group functions not allowed to be used by the user. For example, it is assumed that the user m may not use a group function 3 and a group function 4, the group function use permission corresponding to the user m may include group function identifiers respectively corresponding to the group function 3 and the group function 4.

Furthermore, in addition to the group function use permission represented based on the group function identifier corresponding to the group function, the group function use permission may alternatively be represented based on other information (for example, a group function name) that can represent the group function. A representation form of the group function use permission is not limited in this application.

In a possible implementation, the target correspondence in this application may directly represent group function use permissions corresponding to different users, that is, the target correspondence may be a correspondence between the identity of the user and the group function use permission.

In this scenario, the server may directly search the target correspondence for the target identity carried in the group operation request, and further determine the target group chat function use permission corresponding to the target identity.

For example, the instant messaging APP can be a messaging APP oriented to enterprise internal employees. A target correspondence adapted to actual management requirements of a specific enterprise is stored in the server. The target correspondence includes identities of the enterprise internal employees and corresponding group function use permissions. After receiving a group operation request, the server may search, according to a target identity carried in the group operation request, the target correspondence for a group function use permission corresponding to the target identity, which is used as a target group chat function use permission of an employee starting the group operation request.

For the foregoing target correspondence, an embodiment of this application provides two exemplary manners of determining the target correspondence, and the following describes the two manners of determining the target correspondence in detail.

First manner: automatically determining a corresponding group function use permission for each user by using a pre-trained use permission configuration model. Specifically, personal basic information corresponding to the identity is first obtained, the personal basic information being used for representing a personal feature of a user corresponding to the identity; the group function use permission corresponding to the identity is then determined according to the personal basic information by using the use permission configuration model, the use permission configuration model being a neural network model obtained through training based on sample personal basic information and an annotated group function use permission corresponding to the sample personal basic information; and the target correspondence is further determined based on the identity and the group function use permission corresponding to the identity.

Specifically, when determining a corresponding group function use permission for a specific user, the server needs to first obtain personal basic information of the user. The personal basic information is usually information that can represent a personal feature of the user. For example, the instant messaging APP is a messaging APP directed to enterprise internal employees. The personal basic information that the server needs to be obtained may include a department, a position, and the like of an employee. The server may then input the obtained personal basic information into the pre-trained use permission configuration model. The use permission configuration model analyzes the inputted personal basic information to correspondingly output a corresponding group function use permission. The group function use permission is a group function use permission to be possessed by the user. In this way, in the foregoing manner, the server may determine corresponding group function use permissions for a plurality of users by using the use permission configuration model, and further construct the target correspondence according to an identity and a group function use permission respectively corresponding to each user.

The foregoing use permission configuration model is a pre-trained neural network model. The server needs to obtain a large quantity of training samples during training of the use permission configuration model. Each training sample includes sample personal basic information and an annotated group function use permission corresponding to the sample personal basic information. The server may perform iterative training on the initially constructed use permission configuration model by using training samples, until the use permission configuration model meets a training ending condition. For example, in accordance with a determination that a quantity of times of training the use permission configuration model reaches a preset quantity of times, the server may determine that the training ending condition is met. In another example, in accordance with a determination that model precision of the use permission configuration model reaches preset precision, the server may determine that the training ending condition is met.

It is to be understood that, to ensure that the group function use permission determined for the user based on the use permission configuration model can meet an actual scenario requirement, the annotated group function use permission used by the server during the training of the use permission configuration model is required to be annotated for the sample personal basic information according to the actual scenario requirement. In other words, the sample personal basic information and the annotated group function use permission corresponding to the sample personal basic information in the training samples are required to meet the actual scenario requirement. To adapt to different actual scenario requirements, the server may train different use permission configuration models by using different training samples.

Second manner: determining a target correspondence according to use permission configuration information set by an administrator. Specifically, the server may receive use permission configuration information transmitted by a management client, the use permission configuration information being generated by the management client in response to a group function use permission configuration operation triggered by the user and including an identity and a group function use permission corresponding to the identity, and further determine the target correspondence according to the use permission configuration information.

During specific implementation, the administrator may perform the group function use permission configuration operation by using the management client, to set corresponding group function use permissions for users within a management range of the administrator. The management client correspondingly generates use permission configuration information in response to the group function use permission configuration operation performed by the administrator, the use permission configuration information including an identity corresponding to a configured user and a group function use permission configured for the user when the administrator performs the group function use permission configuration operation. After generating the use permission configuration information, the management client transmits the use permission configuration information to the server, to help the server determine the target correspondence according to the use permission configuration information.

The foregoing management client may be different from a client used by a common user. The management client may specialize in managing members in an organization. For example, the instant messaging APP is a messaging APP oriented to enterprise internal employees. The management client may be a client specialized in managing the enterprise internal employees. Generally, only enterprise managers have a permission to log in to the management client, and may set corresponding group function use permissions for the enterprise internal employees by using the management client.

In addition, the foregoing management client may alternatively be the client used by the common user. To be specific, a group function use permission configuration function may be additionally set for the client used by the common user, and the administrator of the group may configure corresponding group function use permissions for members in the group by using the group function use permission configuration function.

Figure 4:
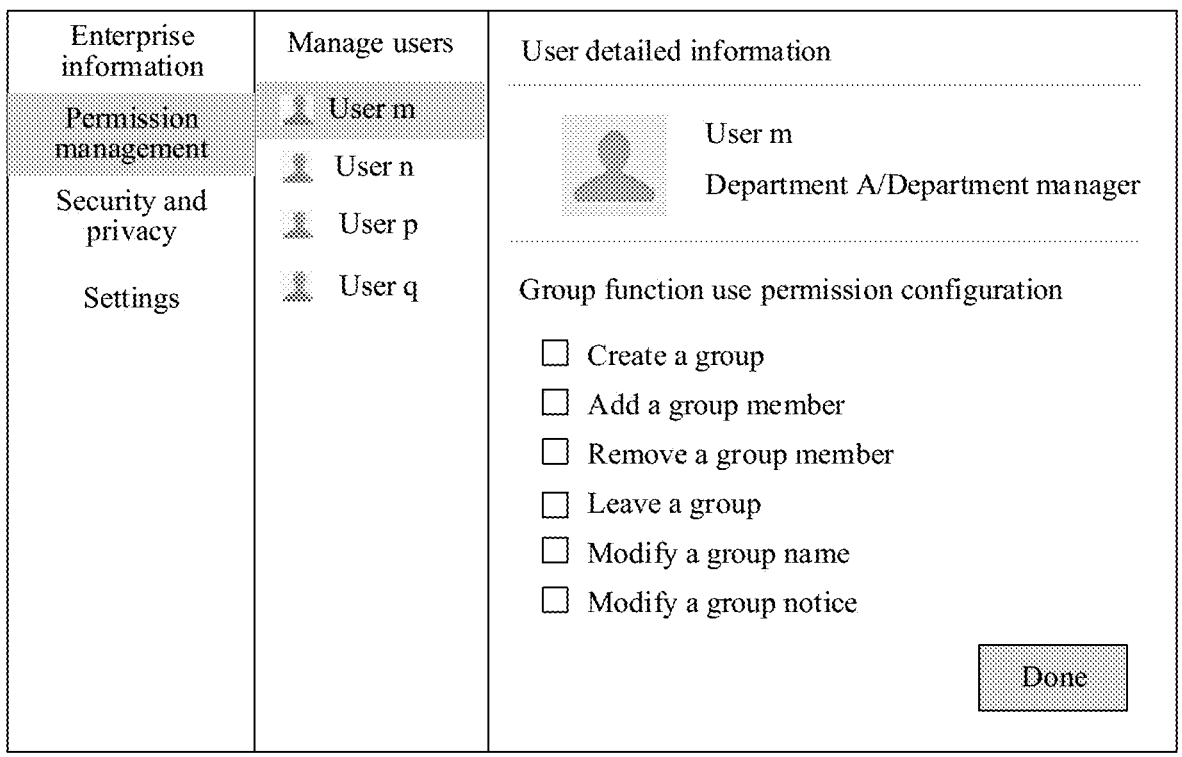
FIG. 4 is a schematic interface diagram of configuring a group function use permission according to an embodiment of this application.

For example, the instant messaging APP is a messaging APP oriented to enterprise internal employees. After logging in to the management client, the administrator may configure group function use permissions for the enterprise internal employees through an interface shown in FIG. 4. For example, the administrator may check, according to personal basic information of a user n, group functions allowed to be used by the user n. After completing a group function use permission configuration operation for the user n, the administrator may click a confirmation control, the management client correspondingly generates use permission configuration information, which includes an identity of the user n and group function identifiers respectively corresponding to various group functions allowed to be used by the user n, and transmits the use permission configuration information to the server through the network, and the server constructs the target correspondence according to the use permission configuration information.

It is to be understood that, in an actual application, in addition to the foregoing two manners of determining the target correspondence, the server may alternatively determine the target correspondence in another manner. The manner of determining the target correspondence is not limited in this application.

In another possible implementation, the target correspondence in this application may indirectly represent the group function use permission corresponding to the user. For example, the target correspondence may include a first correspondence and a second correspondence. The first correspondence is a correspondence between the identity and a user role, and the second correspondence is a correspondence between the user role and the group function use permission. When determining a target group chat function use permission corresponding to a target identity according to the target correspondence, the server may first determine a target user role corresponding to the target identity according to the first correspondence, and then determine the target group chat function use permission corresponding to the target user role according to the second correspondence.

For example, the instant messaging APP is a messaging APP oriented to enterprise internal employees. A first correspondence and a second correspondence that are adapted to actual management requirements of a specific enterprise are stored in the server. The first correspondence is a correspondence between the enterprise employees and user roles. The server may pre-divide, according to the actual management requirements of the enterprise, to obtain a plurality of different user roles, for example, a super administrator, an administrator, a common user, and a whitelist user, and further construct the first correspondence to record identities of the enterprise internal employees and user roles corresponding to the enterprise internal employees. One employee may simultaneously correspond to a plurality of user roles. The second correspondence is a correspondence between the user role and the group function use permission. The server may pre-determine a group function use permission corresponding to the each user role according to the actual management requirements of the enterprise and features of each user role, and further construct the second correspondence to record the user role and the group function use permission corresponding to the user role. One user role may simultaneously correspond to a plurality of group function use permissions.

Figures 5, 6:
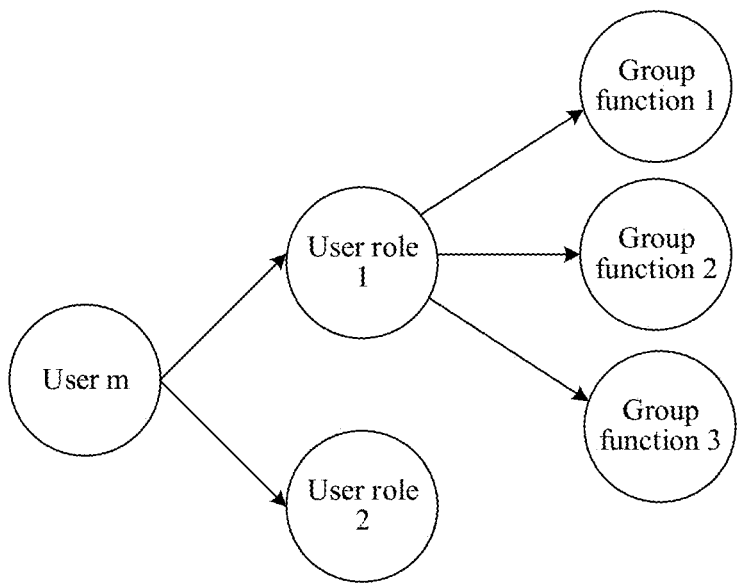
FIG. 5 is a schematic diagram of a correspondence among a user, user roles, and group function use permissions according to an embodiment of this application.
FIG. 6 is a schematic interface diagram of configuring a user role according to an embodiment of this application.

After receiving the group operation request transmitted by the client, the server may first search the first correspondence for a user role corresponding to the target identity as a target user role according to the target identity carried in the group operation request, and further search the second correspondence for a group function use permission corresponding to the target user role as a target group chat function use permission. FIG. 5 shows an exemplary correspondence among a user, user roles, and group function use permissions. Assuming that the server determines, according to a first correspondence, that a target user role corresponding to an identity of a user m includes a user role 1 and a user role 2, the server needs to continuously determine a group function use permission corresponding to the user role 1 and a group function use permission corresponding to the user role 2 according to a second correspondence. In accordance with a determination that the group function use permission corresponding to the user role 1 is that a group function 1, a group function 2, and a group function 3 are allowed to be used, and the group function use permission corresponding to the user role 2 is any group function not allowed to be used, a target group chat function use permission corresponding to the user m is the group function 1, the group function 2, and the group function 3 allowed to be used.

For the foregoing first correspondence, an embodiment of this application provides two exemplary manners of determining the first correspondence, and the following describes the two manners of determining the first correspondence in detail.

First manner: automatically determining a corresponding group function use permission for each user by using a pre-trained user role configuration model. Specifically, personal basic information corresponding to the identity is first obtained, the personal basic information being used for representing a personal feature of a user corresponding to the identity; the user role corresponding to the identity is then determined according to the personal basic information by using the user role configuration model, the user role configuration model being a neural network model obtained through training based on sample personal basic information and an annotated user role corresponding to the sample personal basic information; and the first correspondence is further determined based on the identity and the user role corresponding to the identity.

Specifically, when determining a corresponding user role for a specific user, the server needs to first obtain personal basic information of the user. The personal basic information is usually information that can represent a personal feature of the user. For example, the instant messaging APP is a messaging APP oriented to enterprise internal employees. The personal basic information that the server needs to be obtained may include a department, a position, and the like of an employee. The server may then input the obtained personal basic information into the pre-trained user role configuration model. The user role configuration model analyzes the inputted personal basic information to correspondingly output the user role corresponding to the user. In this way, in the foregoing manner, the server may determine user roles corresponding to a plurality of users by using the user role configuration model, and may further construct the first correspondence according to an identity and a user role respectively corresponding to each user.

The foregoing user role configuration model is a pre-trained neural network model. The server needs to obtain a large quantity of training samples during training of the user role configuration model. Each training sample includes sample personal basic information and an annotated user role corresponding to the sample personal basic information. The server may perform iterative training on the initially constructed user role configuration model by using training samples, until the user role configuration model meets a training ending condition. For example, in accordance with a determination that a quantity of times of training the user role configuration model reaches a preset quantity of times, the server may determine that the training ending condition is met. In another example, in accordance with a determination that model precision of the user role configuration model reaches preset precision, the server may determine that the training ending condition is met.

It is to be understood that, to ensure that the user role determined for the user based on the user role configuration model conforms to an actual scenario requirement, the annotated user role used by the server during the training of the user role configuration model is required to be annotated for the sample personal basic information according to the actual scenario requirement. In other words, the sample personal basic information and the annotated user role corresponding to the sample personal basic information in the training samples are required to meet the actual scenario requirement. To adapt to different actual scenario requirements, the server may train different user role configuration models by using different training samples.

Second manner: determining a first correspondence according to user role configuration information set by an administrator. Specifically, the server may receive user role configuration information transmitted by a management client, the user role configuration information being generated by the management client in response to a user role configuration operation triggered by the user and including an identity and a user role identifier corresponding to the identity, and further determine the first correspondence according to the user role configuration information.

During specific implementation, the administrator may perform the user role configuration operation by using the management client, to set user roles corresponding to users within a management range of the administrator. The management client correspondingly generates user role configuration information in response to the user role configuration operation performed by the administrator, the user role configuration information including an identity corresponding to a configured user and a user role identifier configured for the user when the administrator performs the user role configuration operation. After generating the user role configuration information, the management client transmits the user role configuration information to the server, to help the server determine the first correspondence according to the user role configuration information.

The foregoing management client may be different from a client used by a common user and is a client specializing in managing members in an organization, for example, a client specializing in managing enterprise internal employees. The foregoing management client may alternatively be the client used by the common user. To be specific, a user role configuration function may be additionally set for the client used by the common user, and the administrator of the group may configure corresponding user roles for members in the group by using the user role configuration function.

For example, the instant messaging APP is a messaging APP oriented to enterprise internal employees. After logging in to the management client, the administrator may configure user roles for the enterprise internal employees through an interface shown in FIG. 6. For example, when configuring whitelist users, the administrator may check employees who can be considered as whitelist users from the enterprise internal employees. The administrator may click a confirmation control after completing the user role configuration operation of the whitelist users, the management client correspondingly generates the user role configuration information, which includes identities of the employees checked by the administrator and user role identifiers corresponding to the whitelist users, and transmits the user role configuration information to the server through the network, and the server constructs the first correspondence according to the user role configuration information.

It is to be understood that, in an actual application, in addition to the foregoing two manners of determining the first correspondence, the server may alternatively determine the first correspondence in another manner. The manner of determining the first correspondence is not limited in this application.

For the foregoing second correspondence, an embodiment of this application provides two exemplary manners of determining the second correspondence, and the following describes the two manners of determining the second correspondence in detail.

First manner: automatically determining a corresponding group function use permission for each user role by using a pre-trained role permission configuration model. Specifically, role basic information corresponding to the user role is first obtained, the role basic information being used for representing role features of the user role; the group function use permission corresponding to the user role is then determined according to the role basic information by using a role permission configuration model, the role permission configuration model being a neural network model obtained through training based on sample role basic information and an annotated group function use permission corresponding to the sample personal basic information; and the second correspondence is further determined based on the user role and the group function use permission corresponding to the user role.

Specifically, when determining a corresponding group function use permission for a specific user role, the server needs to first obtain role basic information of the user role. The role basic information is information that can represent features of the user role. For example, role basic information corresponding to a super administrator may include position features of the super administrator, for example, managing employees in a whole range of the enterprise. In another example, role basic information corresponding to the whitelist users may include a position feature of the whitelist users, for example, being not limited by the management of an enterprise internal administrator. The server may then input the obtained role basic information into the pre-trained role permission configuration model. The role permission configuration model analyzes the inputted role basic information to correspondingly output a corresponding group function use permission. The group function use permission is a group function use permission to be possessed by the user role. In this way, in the foregoing manner, the server may determine corresponding group function use permissions used for various user roles by using the role permission configuration model, and further construct the second correspondence according to group function use permissions respectively corresponding to the various user roles.

The foregoing role permission configuration model is a pre-trained neural network model. The server needs to obtain a large quantity of training samples during training of the role permission configuration model. Each training sample includes sample role basic information and an annotated group function use permission corresponding to the sample personal basic information. The server may perform iterative training on the initially constructed role permission configuration model by using training samples, until the role permission configuration model meets a training ending condition. For example, in accordance with a determination that a quantity of times of training the role permission configuration model reaches a preset quantity of times, the server may determine that the training ending condition is met. In another example, in accordance with a determination that model precision of the role permission configuration model reaches preset precision, the server may determine that the training ending condition is met.

It is to be understood that, to ensure that the group function use permission determined for the user role based on the role permission configuration model can meet an actual scenario requirement, the annotated group function use permission used by the server during the training of the role permission configuration model is required to be annotated for the sample personal basic information according to the actual scenario requirement. In other words, the sample role basic information and the annotated group function use permission corresponding to the sample role basic information in the training samples are required to meet the actual scenario requirement. To adapt to different actual scenario requirements, the server may train different role permission configuration models by using different training samples.

Second manner: determining a second correspondence according to role permission configuration information set by an administrator. Specifically, the server may receive role permission configuration information transmitted by a management client, the role permission configuration information being generated by the management client in response to a role use permission configuration operation triggered by the user and including a user role identifier and a group function use permission corresponding to the user role identifier, and further determine the second correspondence according to the role permission configuration information.

During specific implementation, the administrator may perform the role use permission configuration operation by using the management client, to set a corresponding group function use permission for the user role. The management client correspondingly generates role permission configuration information in response to the role use permission configuration operation performed by the administrator, the role permission configuration information including a user role identifier corresponding to a configured user role and a group function use permission configured for the user role when the administrator performs the role use permission configuration operation. After generating the role permission configuration information, the management client transmits the role permission configuration information to the server, to help the server determine the second correspondence according to the role permission configuration information.

The foregoing management client may be different from a client used by a common user and is a client specializing in managing members in an organization, for example, a client specializing in managing enterprise internal employees. The foregoing management client may alternatively be the client used by the common user. To be specific, a role permission configuration function may be additionally set for the client used by the common user, and the administrator of the group may configure corresponding group function use permissions for various user roles by using the role permission configuration function.

For example, the instant messaging APP is a messaging APP oriented to enterprise internal employees. After logging in to the management client, the administrator may configure group function use permissions for the user roles on through an interface shown in FIG. 7. For example, the administrator may check, according to position information of a user role, group functions allowed to be used by the user role. After completing a group function use permission configuration operation for the user role, the administrator may click a confirmation control, the management client correspondingly generates role permission configuration information, which includes a user role identifier corresponding to the user role and group function identifiers respectively corresponding to various group functions allowed to be used by the user role, and transmits the role permission configuration information to the server through the network, and the server constructs the second correspondence according to the role permission configuration information, the role permission configuration information.

It is to be understood that, in an actual application, in addition to the foregoing two manners of determining the second correspondence, the server may alternatively determine the second correspondence in another manner. The manner of determining the second correspondence is not limited in this application.

Step 203: Transmit group operation result information to the client in accordance with a determination that, according to the target group chat function use permission and the target group chat function identifier, that a user corresponding to the target identity has a permission to use the target group chat function.

After determining the target group chat function use permission corresponding to the target identity carried in the group operation request, the server may determine, according to the target group chat function use permission and based on the target group chat function identifier carried in the group operation request, whether a user corresponding to the target identity has a permission to use a target group chat function corresponding to the target group chat function identifier.

In accordance with a determination that the target group chat function use permission includes group function identifiers corresponding to group functions that are allowed to be used, the server may search the target group chat function use permission for a target group chat function identifier. If the target group chat function identifier is found in the target group chat function use permission, it may be determined that the user corresponding to the target identity has the permission to use the target group chat function. On the other hand, if the target group chat function identifier is not found in the target group chat function use permission, it may be determined that the user corresponding to the target identity has no permission to use the target group chat function.

In accordance with a determination that the target group chat function use permission includes group function identifiers corresponding to group functions that are not allowed to be used, the server may search the target group chat function use permission for a target group chat function identifier. If the target group chat function identifier is found in the target group chat function use permission, it may be determined that the user corresponding to the target identity has no permission to use the target group chat function; and if the target group chat function identifier is not found in the target group chat function use permission, it may be determined that the user corresponding to the target identity has the permission to use the target group chat function.

It is to be understood that, when the target group chat function use permission includes other information that can represent group function use permissions, the server may determine, in a corresponding manner and based on the target group chat function identifier, whether the user corresponding to the target identity has the permission to use the target group chat function. The manner of determining whether the user corresponding to the target identity has the permission to use the target group chat function is not limited in this application.

To prevent use restrictions of the group functions from affecting processing of an emergency by the user, the server may intelligently open the group function use permission to the user in accordance with a determination that there is an emergency. Specifically, the server may obtain interactive information generated in a target group chat within a target time period, the target time period being determined according to a trigger moment of the target group chat function, and further determine an emergency rating corresponding to a trigger operation of the target group chat function according to the interactive information. A target group chat function use permission for a target identity is opened in accordance with a determination that the emergency rating is higher than a preset emergency rating and the target group chat function use permission indicates that a user corresponding to the target identity has no permission to use the target group chat function.

During specific implementation, after detecting the trigger operation of the target group chat function, the client may determine the target time period according to the trigger moment of the target group chat function, for example, may determine 10 minutes before the trigger moment of the target group chat function as the target time period. Then, interactive information generated in the target group chat on which the trigger operation of the target group chat function is based is obtained within the target time period, and the interactive information is transmitted to the server. For example, assuming that a user m triggers a target group chat operation of adding a user n to a group A as a group member at 10:50 AM, 10:40 AM to 10:50 AM may be determined as a target time period, chat information generated in the group A within the target time period is obtained, and the obtained chat information is transmitted to the server.

It is to be understood that, in an actual application, the server may also autonomously obtain the interactive information generated in the target group chat with the foregoing target time period. To be specific, the server may also determine the target time period according to a receiving time of the group operation request, and further invoke the interactive information generated in the target group chat within the target time period that is stored in the server.

After obtaining the interactive information, the server may analyze the obtained interactive information, to determine an emergency rating corresponding to the trigger operation of the target group chat function according to an analysis result. For example, the server may preset a plurality of keywords and emergency ratings respectively corresponding to the keywords, and then detect whether the obtained interactive information includes the keywords preset by the server (or words semantically similar to the preset keywords). In accordance with a determination (e.g., detection) that a keyword (or a word semantically similar to the keyword) is included in the interactive information, an emergency rating corresponding to the keyword (or the keyword that is semantically similar) may be determined as the emergency rating corresponding to the trigger operation of the target group chat function. It is to be understood that, in accordance with detecting that a plurality of keywords are included in the obtained interactive information, an emergency rating corresponding to each keyword may be determined, and finally a highest emergency rating is determined as the emergency rating corresponding to the trigger operation of the target group chat function. In another example, the server may pre-train a neural network model configured to determine the corresponding emergency rating according to the interactive information, and input the obtained interactive information into the neural network model. The neural network model correspondingly analyzes the inputted interactive information, and finally an output result of the neural network model is obtained as the emergency rating corresponding to the trigger operation of the target group chat function.

It is to be understood that, in an actual application, the server may alternatively determine the emergency rating corresponding to the trigger operation of the target group chat function in another manner and according to the interactive information. The manner of determining the emergency rating corresponding to the trigger operation of the target group chat function is not limited in this application.

After determining the emergency rating corresponding to the trigger operation of the target group chat function, the server may determine whether the emergency rating is higher than a preset emergency rating. If yes, when the previously determined target group chat function use permission indicates that the user corresponding to the target identity has no permission to use the target group chat function, a use permission of the target group chat function for a user corresponding to the target identity is opened, to be specific, a group function identifier corresponding to the target group chat function is added to the target group chat function use permission (which represents a group function allowed to be used by the user). In this way, the group function use permission may be intelligently opened to the user in an emergency, thereby avoiding affecting processing of the emergency by the user.

It is to be understood that, in an actual application, the server may also preset corresponding preset emergency ratings for different group functions. A higher sensitivity of the group function indicates a higher preset emergency rating corresponding to the group function, and it is more difficult to open permissions for the user. Therefore, a security risk of sensitive group functions may be ensured to be reduced. After determining, by performing the foregoing operations, whether the user corresponding to the target identity has the permission to use the target group chat function, the server may transmit corresponding feedback information to the client according to a determining result, to prompt, by using the client, the user whether an operation of using the target group chat function succeeds.

In accordance with a determination that the determining result indicates that the user corresponding to the target identity has no permission to use the target group chat function, group operation failure information (which may also be regarded as group operation result information) including an operation failure identifier is generated, and further the group operation failure information is transmitted to the client, to prompt, by using the client, the user that the operation of using the group function fails. In accordance with a determination that the determining result indicates that the user corresponding to the target identity has the permission to use the target group chat function, the group operation result information is generated according to target operation information included in the group operation request, and further the group operation result information is transmitted to the client, to display, by using the client, an operation result generated after the user uses target group chat function.

As described in step 201, the client and the server may exchange information according to an agreed data format. Therefore, the server may also generate group operation result information in the agreed data format and transmit the group operation result information to the client. An embodiment of this application provides a data format corresponding to exemplary group operation result information, and the server may generate the group operation result information based on the data format. As shown in 302 in FIG. 3, the group operation result information may include a returned packet header HeadReq and a returned packet body Body. The server may add the target group chat function identifier to the returned packet header HeadReq. The server may also add the operation failure identifier to the returned packet header HeadReq when determining that a current login user on the client has no permission to use the target group chat function, and the server may add the group operation result information corresponding to the target operation information to the returned packet body Body when determining that a user corresponding to the target identity has the permission to use the target group chat function. As shown in a data format of the returned packet header HeadReq in 302, a cmd field may be used for carrying the target group chat function identifier, a seq field may be used for carrying a sequence number corresponding to the group operation result information, where the sequence number can only represent one piece of group operation result information. When it is determined that the user corresponding to the target identity has no permission to use the target group chat function, the returned packet header HeadReq may further include an errorCode field and/or an errorMsg field used for carrying the operation failure identifier. When it is determined that the user corresponding to the target identity has the permission to use the target group chat function, the returned packet header HeadReq may not include the errorCode field and/or the errorMsg field.

It is to be understood that, the data format corresponding to the group operation result information may further be represented in another form, and is not limited in this application.

After receiving the group operation result information returned by the server, the client may first determine whether the returned packet header HeadReq of the group operation result information includes the operation failure identifier. The client may directly display group function operation failure prompt information when the returned packet header HeadReq includes the operation failure identifier. An interface a and an interface b in FIG. 8 are two exemplary interfaces displaying the group function operation failure prompt information. The interface a is used for prompting that the user has no permission to create a group chat, and the interface b is configured for prompting that the user has no permission to add a group member. When the returned packet header HeadReq does not include the operation failure identifier, it indicates that a current login user has a permission to use the target group chat function. In this scenario, the client may correspondingly display, according to the group operation result information carried in the returned packet body Body, an operation result generated after the user uses the target group chat function.

By using the group operation processing method provided in the embodiments of this application, a group function use permission corresponding to a user is determined depending on specific scenario requirements, so that the user can only use a group function to which the user has the use permission. In this way, the use of the group function by the user is flexibly controlled depending on specific scenario requirements, thereby further enriching use scenarios of the group function, effectively reducing a potential security risk of the group function in a sensitive environment, and improving practical value of the group function.

Figure 9:
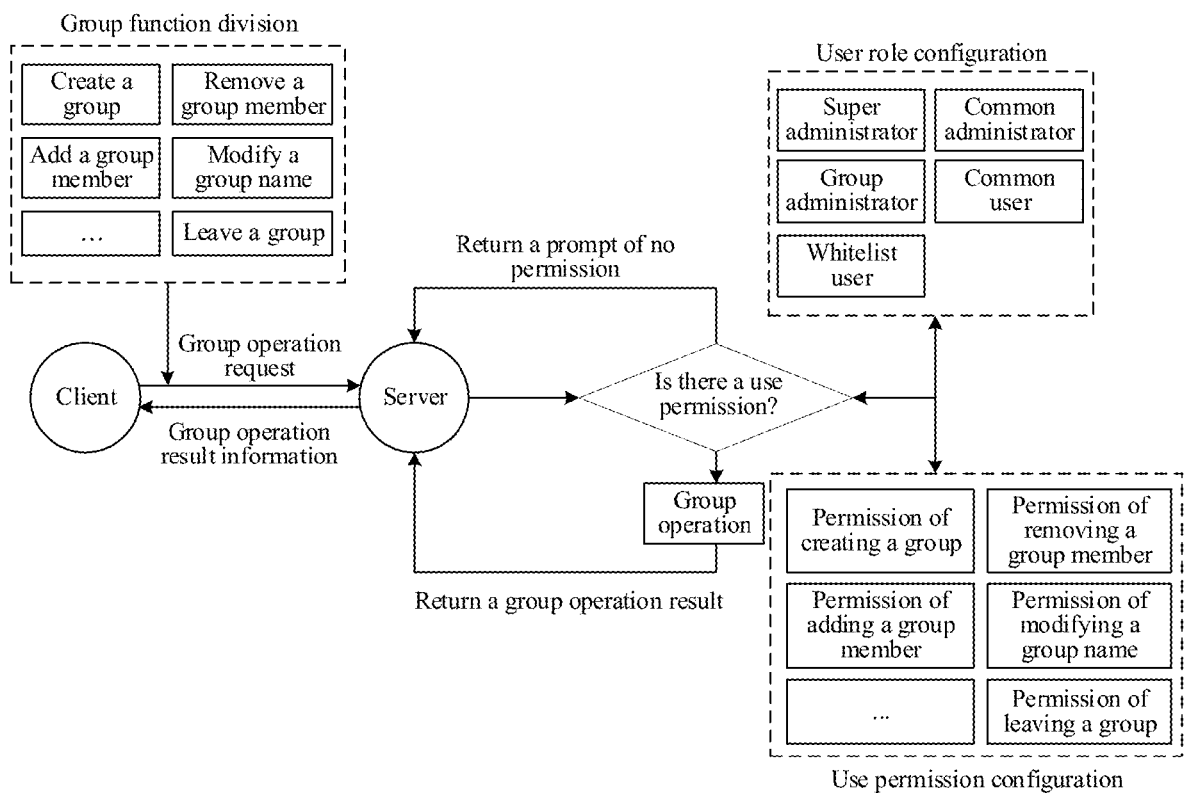
FIG. 9 is a schematic diagram of an implementation framework of a group operation processing method according to an embodiment of this application.

To help further understand the group operation processing method provided in the embodiments of this application, the following uses an example in which the group operation processing method is applicable to a messaging APP oriented to enterprise internal employees, and a target correspondence includes a first correspondence and second correspondence, and with reference to an implementation framework shown in FIG. 9, exemplarily describes the group operation processing method provided in the embodiments of this application.

As shown in FIG. 9, the group operation processing method provided in the embodiments of this application is mainly completed by using the client and the server in cooperation. The client may divide, according to a given principle and functional characteristics, group functions supported by the client. When a group function is triggered by the user, the client may correspondingly generate a group operation request, the group operation request including an identity of a current login user, a group function identifier corresponding to the specific group function, and operation information generated when the user uses the group function, and further transmit the group operation request to the server.

The server may determine a corresponding user role for each enterprise internal employee based on a user role configuration operation performed by an enterprise internal administrator. For example, the each employee may be determined as at least one user role of a super administrator, a common administrator, a group administrator, a common member, or a whitelist user. The server may construct the first correspondence based on a result of the user role configuration operation. In addition, the server may also determine a corresponding group function use permission for each user role based on a role use permission configuration operation performed by the enterprise internal administrator, for example, determine whether the each user role has a permission to create a group, add a group member, remove a group member, modify a group name, leave a group, or the like. The server may construct the second correspondence based on a result of the role use permission configuration operation.

After receiving the group operation request transmitted by the client, the server may first determine, according to the first correspondence, a user role corresponding to a current login user on the client, and then determine a group function use permission corresponding to the user role according to the second correspondence. In accordance with a determination by the server, according to the group function use permission and a target group chat function identifier, that the current login user on the client has no permission to use a group function currently triggered by the user, the server may generate group operation failure information including an operation failure identifier and return the group operation failure information to the client, to prompt, by using the client, the user that the operation of using the group function fails. In accordance with a determination by the server, according to the group function use permission and a group function identifier in the group operation request, that the current login user on the client has the permission to use the group function currently triggered by the user, the server may generate corresponding group operation result information according to operation information carried in the group operation request, and then return the group operation result information to the client, to prompt, by using the client, an operation result generated after the user uses the group function.

Figure 10:
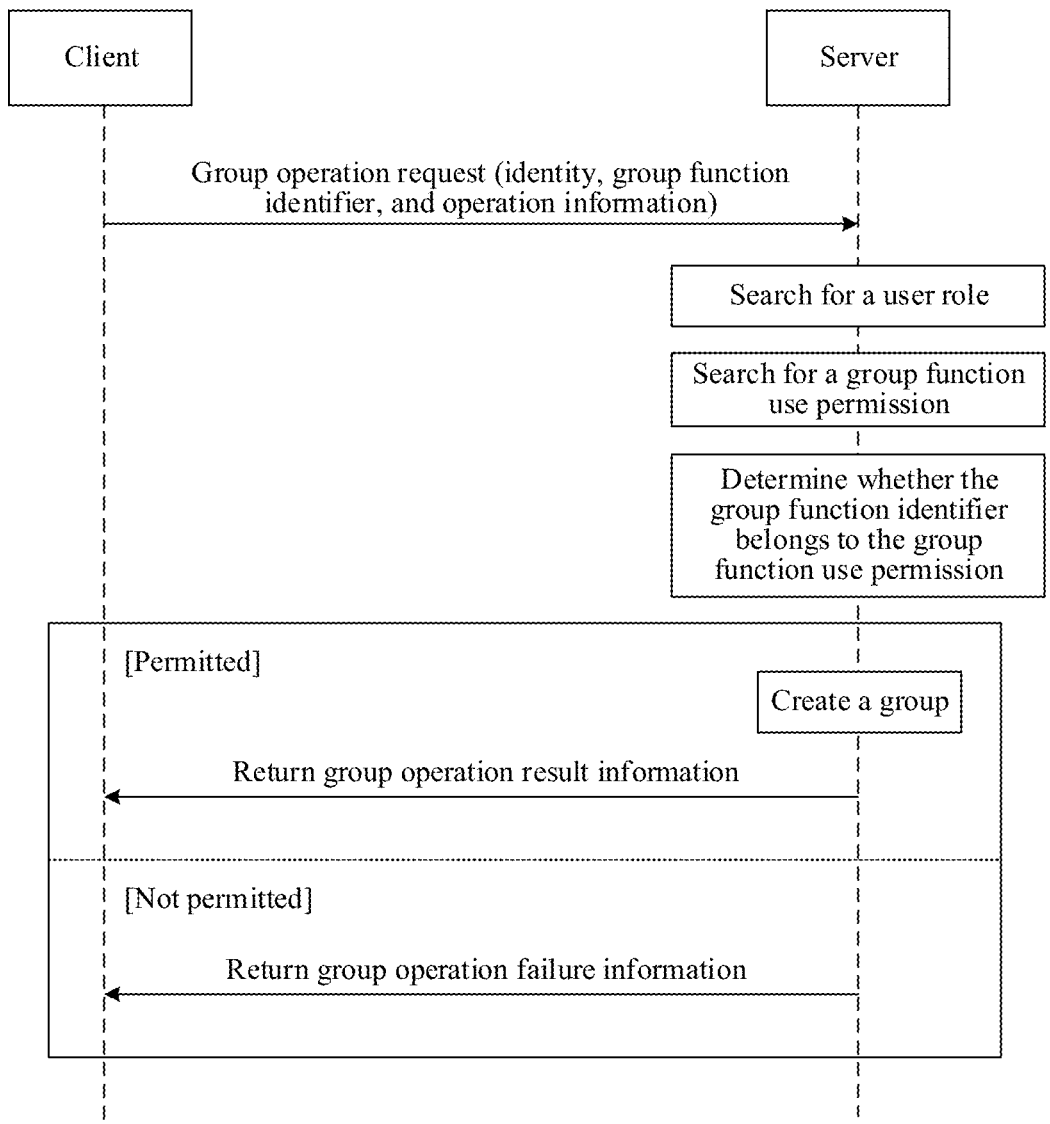
FIG. 10 is a signaling interaction diagram of a group operation processing method according to an embodiment of this application.

The following uses an example in which the user creates a group by using the client, and with reference to the signaling interaction diagram shown in FIG. 10, exemplarily describes the group operation processing method provided in the embodiments of this application.

When a function of creating a group is used by the user on the client, the client may correspondingly generate a group operation request. The group operation request includes an identity of a current login user on the client, a group function identifier corresponding to the function of creating a group, and operation information generated when the user creates the group. After receiving the group operation request, the server may first search for a user role of the current login user on the client according to the first correspondence, then search for a group function use permission corresponding to the user role according to the second correspondence, and further determine whether the group function identifier corresponding to the function of creating a group belongs to the group function use permission. When the group function identifier corresponding to the function of creating a group belongs to the group function use permission, it indicates that the current login user on the client has a permission to use the function of creating a group, and the server may perform an operation of creating a group based on the operation information generated when the user creates the group, and further return a result of creating a group to the client. When the group function identifier corresponding to the function of creating a group does not belong to the group function use permission, it indicates that the current login user on the client has no permission to use the function of creating a group, and prompt information of no use permission is returned to the client.

For the group operation processing method described above, this application further provides a corresponding group operation processing apparatus, so that the group operation processing method is applied and implemented in practice.

Figure 11:
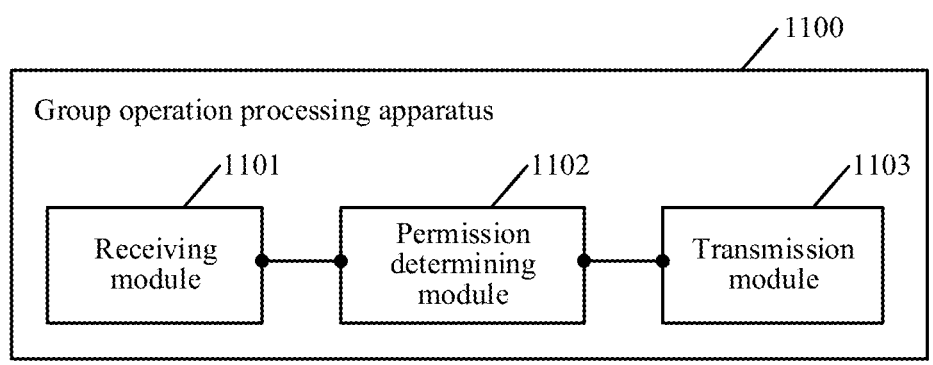
FIG. 11 is a schematic structural diagram of a first group operation processing apparatus according to an embodiment of this application.

Referring to FIG. 11, FIG. 11 is a schematic structural diagram of a group operation processing apparatus 1100 corresponding to the group operation processing method shown in FIG. 2. The group operation processing apparatus 1100 includes:

a receiving module 1101, configured to receive a group operation request transmitted by a client, the group operation request being generated by the client in response to a trigger operation of a target group chat function, the target group chat function including functions related to a target group chat including a plurality of users; and the group operation request including a target identity and a target group chat function identifier corresponding to the target group chat function;

a permission determining module 1102, configured to determine a target group chat function use permission corresponding to the target identity; and a transmission module 1103, configured to transmit group operation result information to the client when it is determined, according to the target group chat function use permission and the target group chat function identifier, that a user corresponding to the target identity has a permission to use the target group chat function.

In some embodiments, based on the group operation processing apparatus shown in FIG. 11, the permission determining module 1102 is specifically configured to:

determine target permission information, the target permission information including at least one of a credit rating corresponding to the target identity or a sensitive rating corresponding to the target group chat function identifier; and determine the target group chat function use permission according to the target permission information.

Figure 12:
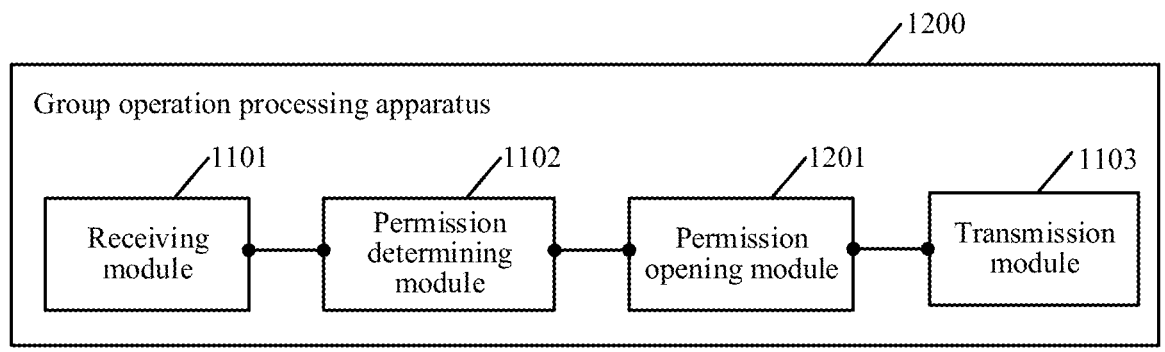
FIG. 12 is a schematic structural diagram of a second group operation processing apparatus according to an embodiment of this application.

In some embodiments, referring to FIG. 12 based on the group operation processing apparatus shown in FIG. 11, FIG. 12 is a schematic structural diagram of another group operation processing apparatus 1200 according to an embodiment of this application. As shown in FIG. 12, the apparatus further includes:

a permission opening module 1201, configured to obtain interactive information generated in the target group chat within a target time period, the target time period being determined according to a trigger moment of the target group chat function; determine, according to the interactive information, an emergency rating corresponding to the trigger operation of the target group chat function; and open a use permission of the user for the target group chat function in accordance with a determination that the emergency rating is higher than a preset emergency rating, and the target group chat function use permission indicates that the user corresponding to the target identity has no permission to use the target group chat function.

Figure 13:
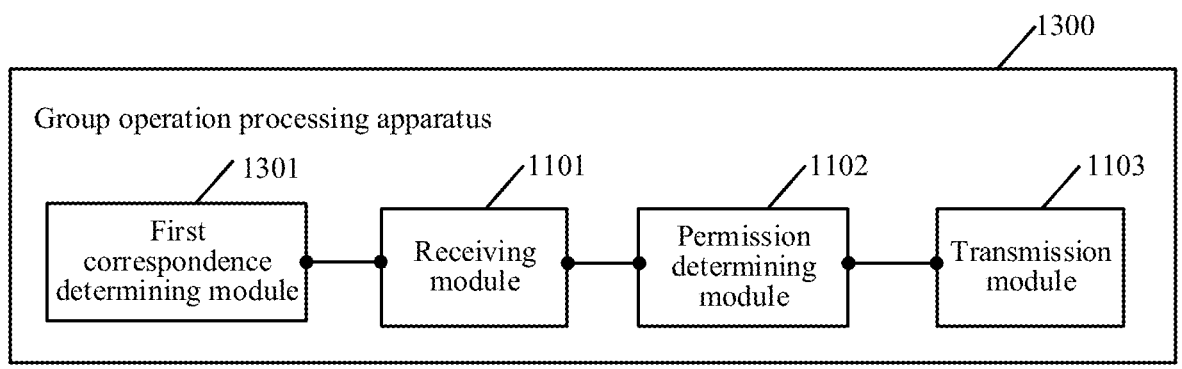
FIG. 13 is a schematic structural diagram of a third group operation processing apparatus according to an embodiment of this application.

In some embodiments, based on the group operation processing apparatus shown in FIG. 11, the permission determining module 1102 is specifically configured to:

obtain a target correspondence, the target correspondence being used for representing a correspondence between an identity and a group function use permission; and determine the target group chat function use permission corresponding to the target identity according to the target correspondence. In some embodiments, referring to FIG. 13 based on the group operation processing apparatus shown in FIG. 11, FIG. 13 is a schematic structural diagram of another group operation processing apparatus 1300 according to an embodiment of this application. As shown in FIG. 13, the apparatus further includes:

a first correspondence determining module 1301, configured to obtain personal basic information corresponding to the identity, the personal basic information being used for representing a personal feature of a user corresponding to the identity; determine a group function use permission corresponding to the identity according to the personal basic information by using a use permission configuration model, the use permission configuration model being a neural network model obtained through training based on sample role basic information and an annotated group function use permission corresponding to the sample personal basic information; and determine the target correspondence based on the identity and the group function use permission corresponding to the identifier.

Figure 14:
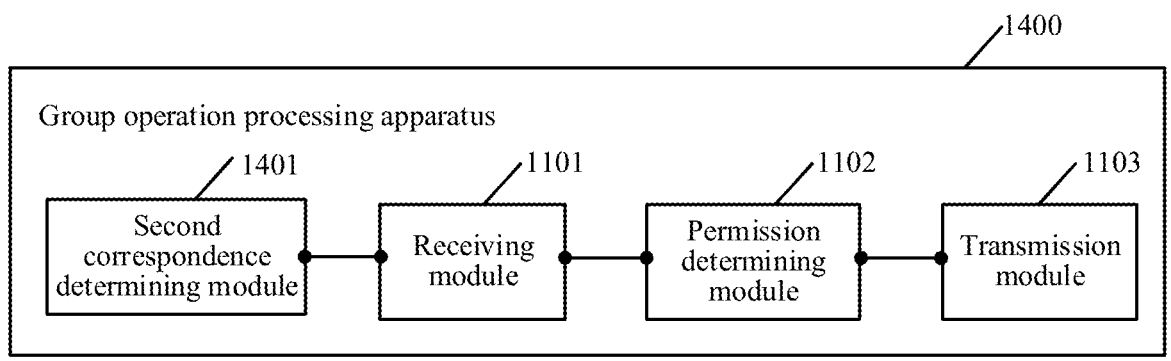
FIG. 14 is a schematic structural diagram of a fourth group operation processing apparatus according to an embodiment of this application.

In some embodiments, referring to FIG. 14 based on the group operation processing apparatus shown in FIG. 11, FIG. 14 is a schematic structural diagram of another group operation processing apparatus 1400 according to an embodiment of this application. As shown in FIG. 14, the apparatus further includes:

a second correspondence determining module 1401, configured to receive use permission configuration information transmitted by a management client, the use permission configuration information being generated by the management client in response to a group function use permission configuration operation triggered by the user, and the use permission configuration information including an identity and a group function use permission corresponding to the identity; and determine a target correspondence according to the use permission configuration information.

In some embodiments, based on the group operation processing apparatus shown in FIG. 11, the target correspondence includes a first correspondence and a second correspondence, the first correspondence is a correspondence between the identity and a user role, and the second correspondence is a correspondence between the user role and the group function use permission. The permission determining module 1102 is specifically configured to:

determine a target user role corresponding to the target identity according to the first correspondence; and determine the target group chat function use permission corresponding to the target user role according to the second correspondence.

Figure 15:
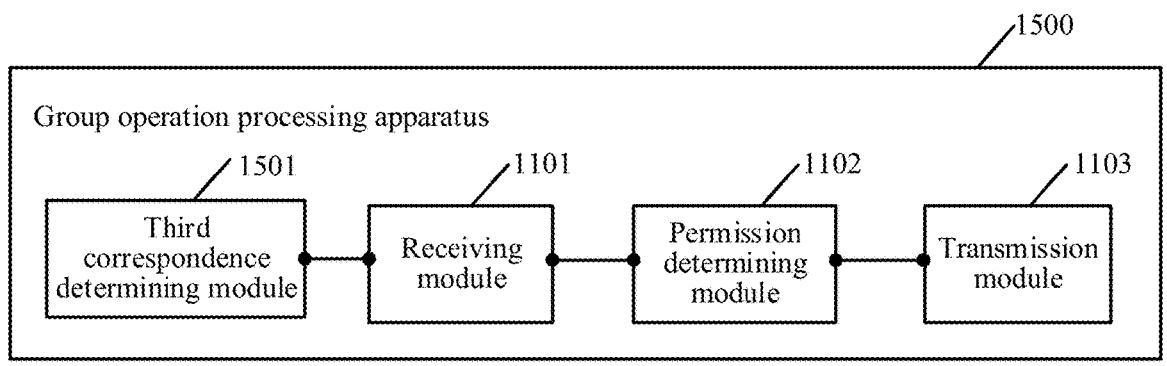
FIG. 15 is a schematic structural diagram of a fifth group operation processing apparatus according to an embodiment of this application.

In some embodiments, referring to FIG. 15 based on the group operation processing apparatus shown in FIG. 11, FIG. 15 is a schematic structural diagram of another group operation processing apparatus 1500 according to an embodiment of this application. As shown in FIG. 15, the apparatus further includes:

a third correspondence determining module 1501, configured to obtain personal basic information corresponding to the identity, the personal basic information being used for representing a personal feature of a user corresponding to the identity; determine a user role corresponding to the identity according to the personal basic information by using a user role configuration model, the user role configuration model being a neural network model obtained through training based on sample personal basic information and an annotated user role corresponding to the sample personal basic information; and determine the first correspondence based on the identity and the user role corresponding to the identity.

Figure 16:
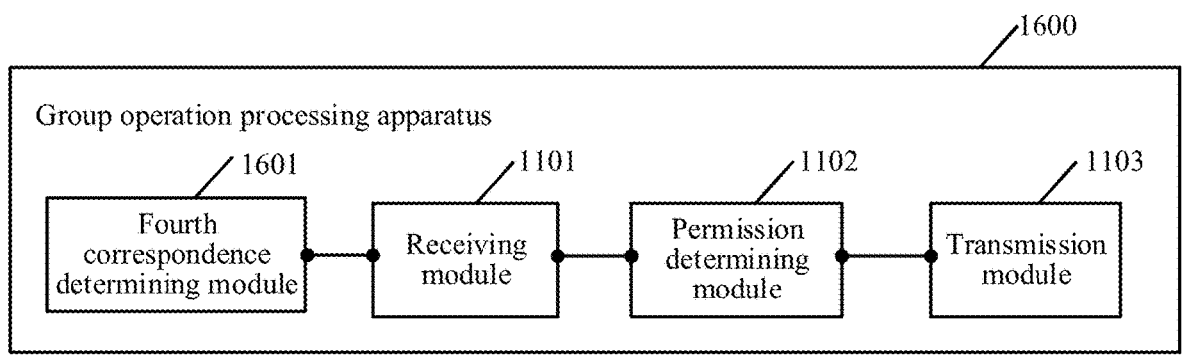
FIG. 16 is a schematic structural diagram of a sixth group operation processing apparatus according to an embodiment of this application.

In some embodiments, referring to FIG. 16 based on the group operation processing apparatus shown in FIG. 11, FIG. 16 is a schematic structural diagram of another group operation processing apparatus 1600 according to an embodiment of this application. As shown in FIG. 16, the apparatus further includes:

a fourth correspondence determining module 1601, configured to obtain role basic information corresponding to the user role, the role basic information being used for representing role features of the user role; determine the group function use permission corresponding to the user role according to the role basic information by using a role permission configuration model, the role permission configuration model being a neural network model obtained through training based on sample role basic information and an annotated group function use permission corresponding to the sample personal basic information; and determine the second correspondence based on the user role and the group function use permission corresponding to the user role.

In some embodiments, based on the group operation processing apparatus shown in FIG. 11, the transmission module 1104 is further configured to:

transmit group operation failure information to the client when it is determined, according to the target group chat function use permission and the target group chat function identifier, that a user corresponding to the target identity has no permission to use the target group chat function, the group operation failure information including an operation failure identifier.

In some embodiments, based on the group operation processing apparatus shown in FIG. 11, the group operation request further includes target operation information generated by the client in response to the trigger operation of the target group chat function. The transmission module 1104 is specifically configured to:

generate the group operation result information according to the target operation information when it is determined, according to the target group chat function use permission and the target group chat function identifier, that a user corresponding to the target identity has a permission to use the target group chat function.

By using the group operation processing apparatus provided in this embodiment of this application, a group function use permission corresponding to a user is determined depending on specific scenario requirements, so that the user can only use a group function to which the user has the use permission. In this way, the use of the group function by the user is flexibly controlled depending on specific scenario requirements, thereby further enriching use scenarios of the group function, effectively reducing a potential security risk of the group function in a sensitive environment, and improving practical value of the group function.

An embodiment of this application further provides a device for processing a group operation. The device may specifically be a server. The server provided in this embodiment of this application is described below from the perspective of hardware materialization.

Figure 17:
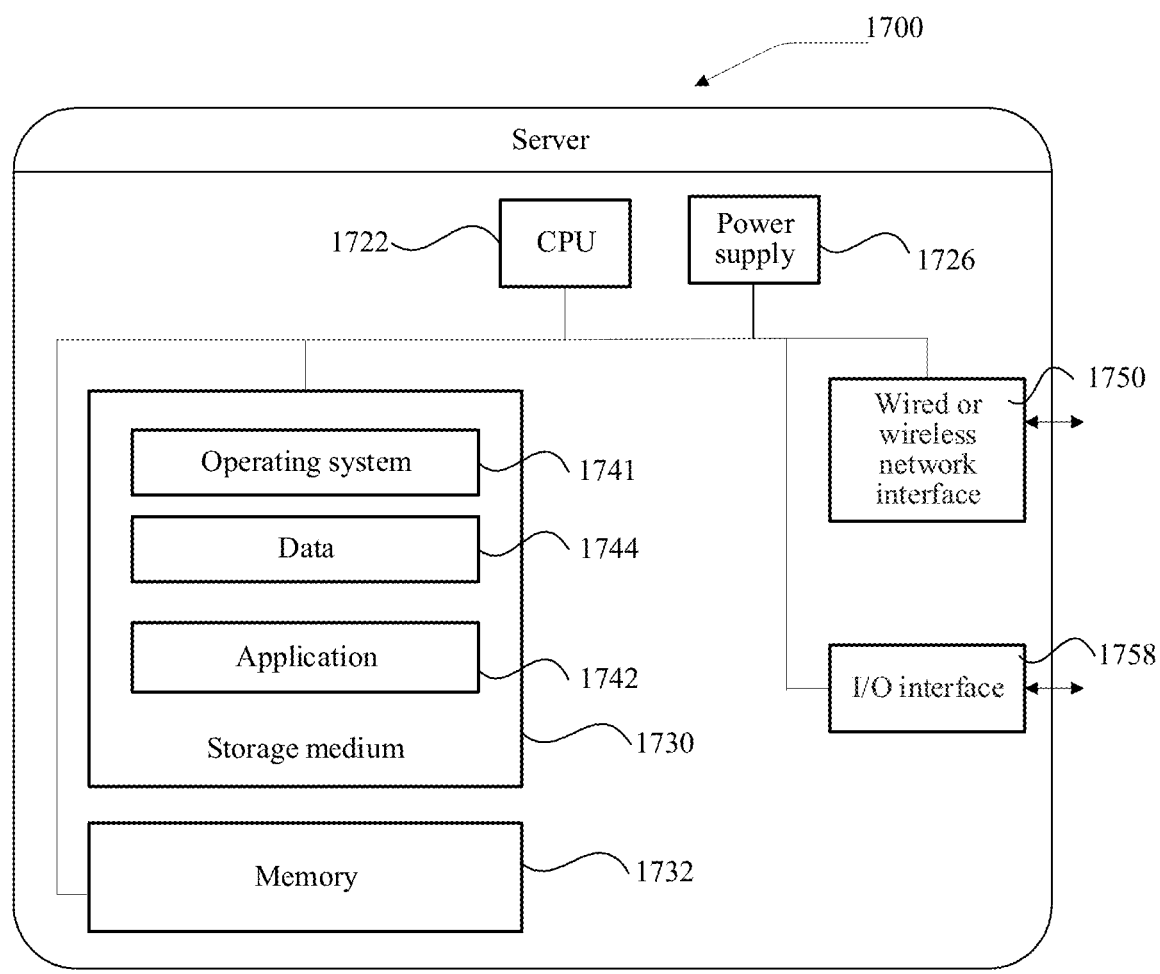
FIG. 17 is a schematic structural diagram of a server according to an embodiment of this application.

Referring to FIG. 17, FIG. 17 is a schematic structural diagram of a server 1700 according to an embodiment of this application. The server 1700 may greatly vary due to different configurations or performance, and may include one or more central processing units (CPU) 1722 (for example, one or more processors) and memories 1732, and one or more non-transitory storage media 1730 (for example, one or more mass storage devices) storing an application 1742 or data 1744. The memory 1732 and the non-transitory storage medium 1730 may implement transient storage or permanent storage. The program stored in the storage medium 1730 may include one or more modules (not shown in the figure), and each module may include a series of instructions to the server. Further, the CPU 1722 may be configured to communicate with the storage medium 1730 to perform the series of instruction operations in the storage medium 1730 on the server 1700.

The server 1700 may further include one or more power supplies 1726, one or more wired or wireless network interfaces 1750, one or more input/output interfaces 1758, and/or one or more operating systems 1741, such as Windows Server™, Mac OS X™ Unix™, Linux™, and FreeBSD™.

The steps performed by the server in the foregoing embodiment may be based on the structure of the server shown in FIG. 17.

The CPU 1722 is configured to perform the following operations:

receiving a group operation request transmitted by a client, the group operation request being generated by the client in response to a trigger operation of a target group chat function, the target group chat function including functions related to a target group chat including a plurality of users; and the group operation request including a target identity and a target group chat function identifier corresponding to the target group chat function;

determining a target group chat function use permission corresponding to the target identity; and transmitting group operation result information to the client when it is determined, according to the target group chat function use permission and the target group chat function identifier, that a user corresponding to the target identity has a permission to use the target group chat function.

In some embodiments, the CPU 1722 may be further configured to perform the steps in any implementation of the group operation processing method provided in the embodiments of this application.

An embodiment of this application further provides a computer-readable storage medium (e.g., a non-transitory computer-readable storage medium), configured to store a computer program, the computer program being configured to perform any implementation in a group operation processing method described in the foregoing embodiments.

An embodiment of this application further provides a computer program product including an instruction. When the instructions are run on a computer, the computer performs any implementation of a group operation processing method described in the foregoing embodiments.

It will be appreciated by a person skilled in the art that for convenience and conciseness of description, for specific working processes of the foregoing described system, apparatus and unit, reference may be made to the corresponding processes in the foregoing method embodiments, and details are not described herein.

In the embodiments provided in this application, the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be omitted or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual requirements to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store a computer program, such as a USB flash drive, a removable hard disk, a read-only memory (ROM), a random access memory (RAM), a magnetic disk, or an optical disk.

In this application, "at least one" means one or more, and "a plurality of" means two or more. The term "and/or" describes an association between associated objects and represents that three associations may exist. For example, "A and/or B" may indicate that only A exists, only B exists, and both A and B exist, where A and B may be singular or plural. The character "/" in this specification generally indicates an "or" relationship between the associated objects. "At least one of the following" or a similar expression thereof refers to any combination of these items, including one item or any combination of more items. For example, at least one of a, b, or c may indicate: a, b, c, "a and b", "a and c", "b and c", or "a, b, and c", where a, b, and c may be singular or plural.

The foregoing embodiments are merely intended for describing the technical solutions of this application, but not for limiting this application. Although this application is described in detail with reference to the foregoing embodiments, it is to be understood by a person of ordinary skill in the art that modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the technical solutions of the embodiments of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs group operation processing and/or transmitting. In practical application, the foregoing functions may be allocated to and completed by different functional modules according to requirements, that is, an inner structure of a device is divided into different functional modules to implement all or a part of the functions described above.

What is claimed is:

1. A group chat operation processing method, performed by a server, the method comprising:
   receiving a group operation request transmitted by a client, wherein the group operation request is generated by the client in response to a trigger operation of a target group chat function, the target group chat function comprising functions related to a target group chat that includes a plurality of users, and the group operation request comprises a target identity and a target group chat function identifier corresponding to the target group chat function;
   determining a target group chat function use permission corresponding to the target identity, further comprising:
      determining a target user role corresponding to the target identity according to a first correspondence, wherein the first correspondence is a correspondence between a user corresponding to the target identity and a corresponding user role; and
      determining the target group chat function use permission corresponding to the target user role according to a second correspondence, wherein the second correspondence is a correspondence between a user role and a corresponding group function use permission; and
   in accordance with a determination, based on the target group chat function use permission and the target group chat function identifier, that a user corresponding to the target identity has a permission to use the target group chat function, transmitting group operation result information to the client.

2. The method according to claim 1, wherein determining the target group chat function use permission corresponding to the target identity comprises:
   determining target permission information, the target permission information comprising at least one of a credit rating corresponding to the target identity or a sensitive rating corresponding to the target group chat function identifier; and
   determining the target group chat function use permission according to the target permission information.

3. The method according to claim 1, further comprising:
   obtaining interactive information generated in the target group chat within a target time period, the target time period being determined according to a trigger moment of the target group chat function;
   determining, according to the interactive information, an emergency rating corresponding to the trigger operation of the target group chat function; and
   opening a use permission of the user for the target group chat function in accordance with a determination that the emergency rating is higher than a preset emergency rating and the target group chat function use permission indicates that the user corresponding to the target identity has no permission to use the target group chat function.

4. The method according to claim 1, further comprising:
   obtaining personal basic information corresponding to the target identity, the personal basic information being used for representing a personal feature of a user corresponding to the target identity;
   determining a group function use permission corresponding to the target identity according to the personal basic information using a use permission configuration model, the use permission configuration model being a neural network model obtained through training based on sample personal basic information and an annotated group function use permission corresponding to the sample personal basic information; and determining the first correspondence and the second correspondence based on the target identity and the group function use permission corresponding to the target group chat function identifier.

5. The method according to claim 1, further comprising:
receiving use permission configuration information transmitted by a management client, the use permission configuration information being generated by the management client in response to a group function use permission configuration operation triggered by the user, and the use permission configuration information comprising an identity and a group function use permission corresponding to the identity; and
determining a target correspondence according to the use permission configuration information.

6. The method according to claim 1, further comprising:
obtaining personal basic information corresponding to the target identity, the personal basic information being used for representing a personal feature of a user corresponding to the target identity;
determining a user role corresponding to the target identity according to the personal basic information by using a user role configuration model, the user role configuration model being a neural network model obtained through training based on sample personal basic information and an annotated user role corresponding to the sample personal basic information; and
determining the first correspondence based on the target identity and the user role corresponding to the target identity.

7. The method according to claim 1, further comprising:
obtaining role basic information corresponding to the target user role, the role basic information being used for representing role features of the target user role;
determining the group function use permission corresponding to the target user role according to the role basic information by using a role permission configuration model, the role permission configuration model being a neural network model obtained through training based on sample role basic information and an annotated group function use permission corresponding to the sample personal basic information; and
determining the second correspondence based on the target user role and the group function use permission corresponding to the target user role.

8. The method according to claim 1, further comprising:
transmitting group operation failure information to the client in accordance with a determination, according to the target group chat function use permission and the target group chat function identifier, that a user corresponding to the target identity has no permission to use the target group chat function, the group operation failure information comprising an operation failure identifier.

9. The method according to claim 1, wherein:
the group operation request further comprises target operation information generated by the client in response to the trigger operation of the target group chat function; and
in accordance with a determination, according to the target group chat function use permission and the target group chat function identifier, that a user corresponding to the target identity has a permission to use the target group chat function, the method further comprises:
generating the group operation result information according to the target operation information.

10. A server system, comprising:
one or more processors; and
memory storing one or more programs, the one or more programs comprising instructions that, when executed by the one or more processors, cause the one or more processors to perform operations comprising:
receiving a group operation request transmitted by a client, wherein the group operation request is generated by the client in response to a trigger operation of a target group chat function, the target group chat function comprising functions related to a target group chat that includes a plurality of users, and the group operation request comprises a target identity and a target group chat function identifier corresponding to the target group chat function;
determining a target group chat function use permission corresponding to the target identity, further comprising:
determining a target user role corresponding to the target identity according to a first correspondence, wherein the first correspondence is a correspondence between a user corresponding to the target identity and a corresponding user role; and
determining the target group chat function use permission corresponding to the target user role according to a second correspondence, wherein the second correspondence is a correspondence between a user role and a corresponding group function use permission; and
in accordance with a determination, based on the target group chat function use permission and the target group chat function identifier, that a user corresponding to the target identity has a permission to use the target group chat function, transmitting group operation result information to the client.

11. The server system according to claim 10, wherein determining the target group chat function use permission corresponding to the target identity comprises:
determining target permission information, the target permission information comprising at least one of a credit rating corresponding to the target identity or a sensitive rating corresponding to the target group chat function identifier; and
determining the target group chat function use permission according to the target permission information.

12. The server system according to claim 10, wherein the operations further comprise:
obtaining interactive information generated in the target group chat within a target time period, the target time period being determined according to a trigger moment of the target group chat function;
determining, according to the interactive information, an emergency rating corresponding to the trigger operation of the target group chat function; and
opening a use permission of the user for the target group chat function in accordance with a determination that the emergency rating is higher than a preset emergency rating and the target group chat function use permission indicates that the user corresponding to the target identity has no permission to use the target group chat function.

13. The server system according to claim 10, wherein the operations further comprise:

obtaining personal basic information corresponding to the target identity, the personal basic information being used for representing a personal feature of a user corresponding to the target identity;

determining a group function use permission corresponding to the target identity according to the personal basic information using a use permission configuration model, the use permission configuration model being a neural network model obtained through training based on sample personal basic information and an annotated group function use permission corresponding to the sample personal basic information; and determining the first correspondence and the second correspondence based on the target identity and the group function use permission corresponding to the target group chat function identifier.

14. The server system according to claim 10, wherein the operations further comprise:

receiving use permission configuration information transmitted by a management client, the use permission configuration information being generated by the management client in response to a group function use permission configuration operation triggered by the user, and the use permission configuration information comprising an identity and a group function use permission corresponding to the identity; and determining a target correspondence according to the use permission configuration information.

15. A non-transitory computer-readable storage medium, storing a computer program, the computer program, when executed by one or more processors of a server system, cause the one or more processors to perform operations comprising:

receiving a group operation request transmitted by a client, wherein the group operation request is generated by the client in response to a trigger operation of a target group chat function, the target group chat function comprising functions related to a target group chat that includes a plurality of users, and the group operation request comprises a target identity and a target group chat function identifier corresponding to the target group chat function;

determining a target group chat function use permission corresponding to the target identity, further comprising:

determining a target user role corresponding to the target identity according to a first correspondence, wherein the first correspondence is a correspondence between a user corresponding to the target identity and a corresponding user role; and determining the target group chat function use permission corresponding to the target user role according to a second correspondence, wherein the second correspondence is a correspondence between a user role and a corresponding group function use permission; and in accordance with a determination, based on the target group chat function use permission and the target group chat function identifier, that a user corresponding to the target identity has a permission to use the target group chat function, transmitting group operation result information to the client.

16. The non-transitory computer-readable storage medium according to claim 15, wherein the operations further comprise:

transmitting group operation failure information to the client in a case that it is determined, according to the target group chat function use permission and the target group chat function identifier, that a user corresponding to the target identity has no permission to use the target group chat function, the group operation failure information comprising an operation failure identifier.

17. The non-transitory computer-readable storage medium according to claim 15, wherein:

the group operation request further comprises target operation information generated by the client in response to the trigger operation of the target group chat function; and in accordance with a determination, according to the target group chat function use permission and the target group chat function identifier, that a user corresponding to the target identity has a permission to use the target group chat function, the operations further comprise:

generating the group operation result information according to the target operation information.

18. The non-transitory computer-readable storage medium according to claim 15, wherein determining the target group chat function use permission corresponding to the target identity comprises:

determining target permission information, the target permission information comprising at least one of a credit rating corresponding to the target identity or a sensitive rating corresponding to the target group chat function identifier; and determining the target group chat function use permission according to the target permission information.

19. The non-transitory computer-readable storage medium according to claim 15, wherein the operations further comprise:

obtaining interactive information generated in the target group chat within a target time period, the target time period being determined according to a trigger moment of the target group chat function;

determining, according to the interactive information, an emergency rating corresponding to the trigger operation of the target group chat function; and opening a use permission of the user for the target group chat function in accordance with a determination that the emergency rating is higher than a preset emergency rating and the target group chat function use permission indicates that the user corresponding to the target identity has no permission to use the target group chat function.

* * * * *